April 25, 1939.   L. L. JASKEY   2,155,941
BATTERY SUPPORTING MEANS
Filed March 4, 1938
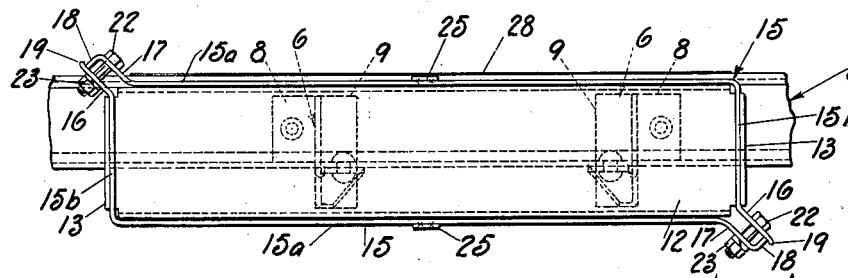
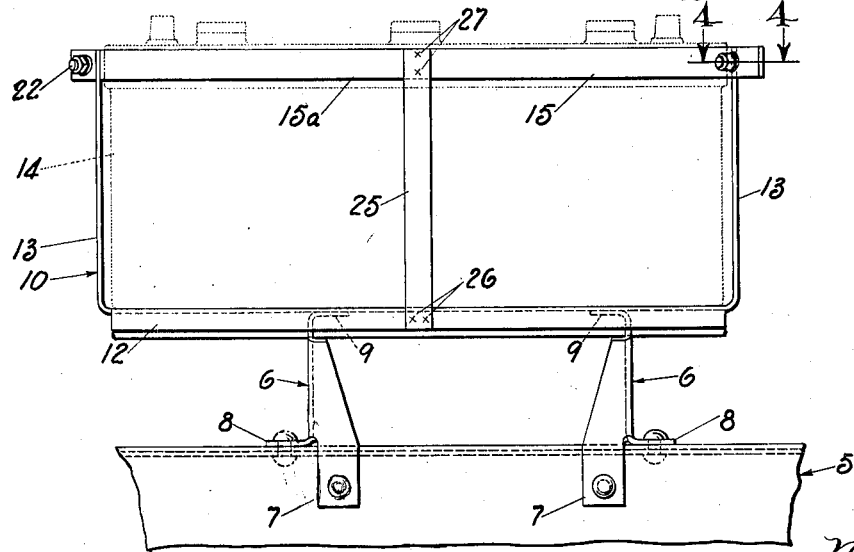
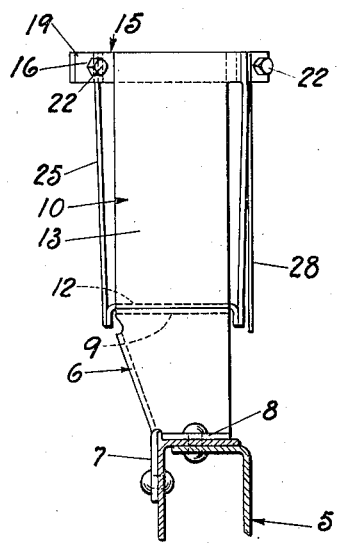
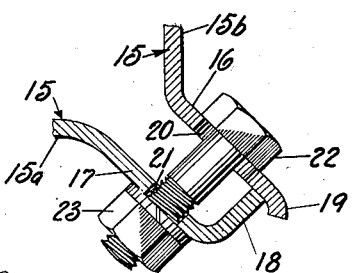
INVENTOR.
Leo L. Jaskey
BY Walter E. Schirmer
ATTORNEY.

Patented Apr. 25, 1939

2,155,941

UNITED STATES PATENT OFFICE 2,155,941

BATTERY SUPPORTING MEANS

Leo L. Jaskey, South Bend, Ind., assignor to The Studebaker Corporation, South Bend, Ind., a corporation of Delaware Application March 4, 1938, Serial No. 193,839

3 Claims. (Cl. 180—68.5)

This invention relates to battery supporting means and more particularly is directed to means for supporting batteries in automotive vehicles and the like.

It has become an increasingly prevalent practice to mount the battery used for the ignition, lighting and accessory circuits of a vehicle within the engine compartment. Such mountings have included recessed cowl portions for receiving the battery, or bracket and clamp members for supporting the battery on some portion of the frame members within the compartment.

The main disadvantage of previous mountings, so far as I am aware, has been in the inability to secure proper ventilation for batteries disposed in recessed portions of the cowl, and the consequent necessity for additional ventilating means including ducts, fan motors, supports and the like, all of which materially increase the cost of the battery installation. With batteries mounted on the frame members, it has been found that either vibration or weaving of the frame soon destroys the seal between the cells, or results in cracking of the case, or the excessive clamping pressure necessary to hold the battery in a stable position produces undue stresses on the case which in a short time renders the battery inoperative.

The present invention, in its broader aspects, contemplates a battery support for automotive storage batteries which is capable of holding the battery in stable position without excessive clamping pressure, and which maintains the battery in position for adequate ventilation independently of any ancillary ventilating mechanism.

One of the main objects of the present invention is the provision of a U-shaped supporting member in which the battery is cradled, and which has means engaging about the upper lateral surface of the battery for gripping the same with a substantially uniform pressure to hold the battery against either lateral or vertical movement relative to the cradle member. I have found that with the gripping action provided by my present construction, no additional means is necessary for limiting possible vertical movement of the battery relative to its support.

Another object of the present invention is to provide a rectangularly shaped clamping means on the cradle member, which is formed of two similar L-shaped pieces having angularly offset ends at the diagonally opposite corners of the clamping means. The adjacent angularly offset ends of the two pieces are so designed as to be drawn together by a suitable clamp to produce a tension in the adjacent leg portions and thereby effect a reduction in the rectangular area defined by the clamping means. By this arrangement an equalized inward pressure along all defining edges of the clamping means is attained, insuring no overcompression or undue force being exerted at the corners of the battery case.

Still another feature of the present invention is its economical design and construction, all of the parts being formed from sheet metal stampings and welded together to form the complete support. Thus no special machinery or fixtures are required to completely assemble the support.

Other objects and advantages of the present invention will be more apparent from the following detailed description which, taken in conjunction with the accompanying drawing, will disclose to those skilled in the art the particular construction and operation of a preferred form of the present invention.

In the drawing:

Figure 1 is a plan view of the battery support of the present invention;

Figure 2 is a side elevational view of the support shown in Figure 1;

Figure 3 is an end elevation view of the support shown in Figures 1 and 2; and

Figure 4 is a sectional view taken on the line 4—4 of Figure 2.

Referring now in detail to the drawing the frame member, which may comprise a side rail or the like of the chassis, is indicated generally at 5. Mounted on the frame 5 are a pair of bracket members indicated generally at 6, each of the bracket members having a depending portion 7 adapted to be soldered, riveted, welded or otherwise rigidly secured to the web portion of the channel frame 5, and a normally extending portion 8 which is secured to the top of the channel member in a similar manner.

At the upper ends the brackets are provided with normally extending planar surface portions 9 upon which is mounted a cradle member indicated generally at 10. The base portion of the cradle member comprises a horizontally extending member of generally inverted U-shaped cross section, the side flanges 12 thereof serving as stiffening means for imparting added rigidity to the member 10. The portions 9 of the brackets 6 are adapted to be welded or otherwise rigidly secured to the base portion of the member 10 to form a more or less unitary support therefor upon the frame 5.

The member 10 has upwardly extending planar end portions 13 which define the longitudinal extent of the supporting surface upon which the battery, indicated generally at 14, is adapted to be disposed. The battery normally rests upon the upper surface of the base portion of the member 10 and is prevented from longitudinal movement by engagement with the end portions 13 thereof.

In order to provide for clamping the battery in position against movement relative to the member 10 I preferably provide clamping means constituting a rectangularly-shaped open frame secured in a generally horizontal plane to the upper ends 13 of the cradle member. This frame is preferably formed by providing two generally L-shaped members 15 as shown in Figure 1, the shorter leg portions of each of the members 15 being welded or otherwise suitably secured transversely across the upper ends of the end portions 13 of the cradle member.

At the adjacent ends of the two members 15 the end portions of these members are bent outwardly at an angle of approximately 45°, the shorter leg having a relatively flat extension 16 which extends outwardly adjacent the lateral edge of the end member 13 while the longer leg of the L-shaped member 15 has the extension 17 provided with a normally extending flange 18 which is adapted to bear against the adjacent surface of the flange 16. Preferably the flange 16 at its extremity is bent slightly toward the flange 17, as indicated at 19, to provide a seat for the end of the flange 18 thereby producing a positive abutment stop preventing relative sliding movement of the flange 18 upon the adjacent surface of the flange 16.

Suitable apertures 20 and 21 are formed in the respective portions 16 and 17 of the members 15 and are adapted to receive the bolt 22 extending therethrough and provided with the nut 23 by which the two flanges 16 and 17 are adapted to be drawn toward each other. By the provision of such a structure it will be noted that the flange 17 has pivotal movement about the point of engagement of its end 18 upon the surface of the flange 16 and consequently tightening of the nut 23 on the bolt 22 will result in tension upon the longitudinally extending portion 15a of the member 15 thereby tending to reduce the longitudinal extent of the opening defined by the frame members 15. Similarly the flange 16 is adapted to have a pivotal action at the point of engagement of the portions 18 and 19 and thereby a tension stress is also placed upon the shorter leg portion 15b of the members 15 upon tightening of the nuts which tends to reduce the lateral extent of the opening defined by the members 15.

As a result, when the nuts are tightened the members 15 have cooperating action due to their offset end portions 16 and 17 which results in a tendency to reduce the area of the opening defined by the members 15 while at the same time retaining a true rectangular shape therein. This produces substantially uniform compression upon the lateral surface of the battery adjacent its upper end and does not subject any particular portion of the battery case to localized overstressing or undue compression. Also, this construction insures that a substantially uniform frictional engagement will be provided which, with the pressures attainable, will be capable of holding the battery case against movement vertically relatively to the base portion of the cradle member. Thus, any ancillary means for preventing vertical movement is eliminated.

In order to impart rigidity to the frame members 15 I preferably provide the vertically extending struts 25 which at their lower ends are suitably welded to the side flanges 12 of the cradle member as indicated at 26 and at their upper ends are welded to the longitudinal portions 15a of the flange members 15 as indicated at 27. This serves to hold the frame in position and facilitates insertion and withdrawal of the battery therefrom, but at the same time does not interfere with the proper clamping action of the members 15 about the upper lateral surface of the battery.

Preferably, the brackets 6 are secured on the frame 5 in a position laterally spaced from the engine and adjacent the forward end of the engine compartment. The forward end of the battery support is therefore disposed in a position such as to receive some of the air forced rearwardly by the engine fan. In order to protect the battery itself from excessive heat produced by the engine I may provide the baffle plate 28 secured to the engine side of the supporting means by welding the same to the side of the strut member 25 or by welding to the longitudinally extending portion 15a of the member 15 which projects on the engine side of the support. This baffle serves to prevent direct transmission of heat from the engine to the battery but at the same time permits free circulation about the battery case of the air currents produced by the engine fan and by movement of the vehicle.

It will be apparent that all of the component parts of the battery support disclosed herein can be readily made from sheet metal stampings of relatively light gauge and can be assembled or secured in proper position by means of welding or the like, thus eliminating the necessity of special machinery or fixtures and providing an economical structure. At the same time, the structure by reason of its design possesses the requisite characteristics of rigidity and stability and also is capable of producing uniform clamping pressure about the entire upper lateral surface of the battery which will eliminate any localized overstressing that might tend to destroy the battery cells or fracture the battery case.

I am aware that various changes may be made in certain details of the invention herein shown and described and therefore do not intend to be limited except as defined by the scope and spirit of the appended claims.

I claim:

1. In combination with a channel-shaped vehicle frame member, a pair of brackets secured to the side and top of said member in longitudinally spaced relation, a U-shaped cradle member having its base of inverted channel-shaped section and secured on said brackets, a horizontally extending open rectangular frame secured to the upper ends of said cradle, said frame having two diagonally disposed corners unconnected, and means engaging said ends for exerting a pressure thereon tending to draw the same together to reduce the area of said frame while maintaining a true rectangular opening therein.

2. The combination of claim 1 further characterized in the provision of vertically extending struts between the longitudinal edges of the base of said cradle member and the corresponding sides of said frame.

3. Means for supporting a battery box comprising a U-shaped cradle adapted to receive the box longitudinally therein and having a reinforced inverted channel-shaped base portion supporting the weight of the box, horizontally extending strap means secured to the upper marginal ends of the cradle and defining a rectangular frame fitting about the upper lateral surface of said box, said frame having unconnected portions, means engaging said unconnected portions for contracting the frame to clamp said portions, vertical strut members secured between the longitudinal edges of the base of said cradle and longitudinally extending portions on said strap means, and planar closure plate means depending from one of the longitudinally extending portions of said strap means and overlying the adjacent vertical strut member.

LEO L. JASKEY.